United States Patent [19]
Staar

[11] 3,786,475
[45] Jan. 15, 1974

[54] SELECTOR FOR APPARATUS FOR AUTOMATICALLY PLAYING BACK INFORMATION

[76] Inventor: Marcel Jules Helene Staar, 479 Avenue Louise, Brussels, Belgium

[22] Filed: Sept. 7, 1971

[21] Appl. No.: 177,986

[30] Foreign Application Priority Data
Sept. 7, 1970 Belgium .............................. 755811

[52] U.S. Cl. .. 340/324 A, 179/100.2 S, 235/92 CT, 235/92 EA, 340/162, 340/172.5
[51] Int. Cl. .............................................. G06f 3/14
[58] Field of Search ................. 340/324 A, 324 AD, 340/162; 179/2 DP, 100.2S; 235/92 N, 92 CT, 92 EC, 92 EA

[56] References Cited
UNITED STATES PATENTS

| | | | |
|---|---|---|---|
| 2,829,196 | 4/1958 | Claffey | 340/162 X |
| 3,247,328 | 4/1966 | Mitchell et al. | 340/162 X |
| 3,555,509 | 1/1971 | Arsem | 340/162 |

*Primary Examiner*—David L. Trafton
*Attorney*—Eric H. Waters et al.

[57] ABSTRACT

A selector for apparatus for automatically playing back information comprising a keyboard (11) used in formulating a selection and co-operating with a store (14) and a panel (15) for displaying signs corresponding to those identifying the keys which have been pressed. The numbers, words or combinations can be stored in sequence and in the order in which they have been formulated.

An input register (16) is disposed between the keyboard (11) and the store (14) and is adapted to receive a complex selection so that the latter can be checked before insertion into the store. (FIG. 1).

7 Claims, 5 Drawing Figures

PATENTED JAN 15 1974

3,786,475

PATENTED JAN 15 1974 3,786,475

SHEET 3 OF 5

SELECTOR FOR APPARATUS FOR AUTOMATICALLY PLAYING BACK INFORMATION

CROSS REFERENCE TO RELATED APPLICATION

This application relates to the subject matter disclosed in application Ser. No. 177,987, filed Sept. 7, 1971.

The invention relates to a selector for apparatus for automatically playing back information. In many devices for automatically playing back information of any kind, it is frequently necessary to select one or two items among a very large number.

Such is the case, for example, with cassettes or cartridges containing one or more magnetic recordings, inter alia in automatic machines in which it is necessary to be able to select one cartridge out of a large number and, if required, only a part of a or the recordings in the cartridge.

The invention aims to provide a selector which is particularly simple to operate and which can make a choice, provide a visual check, and store one or more selections in order, so as to introduce and extract selections when needed while providing a continuous visual check of all operations.

Each selection may be complex and comprise a number of digits or letters corresponding to a cassette or an individual recording medium and also to one or more recordings in the cassette or medium.

To this end, the selector according to the invention is characterised in that it comprises a keyboard used for making a selection in order to form digits or letters forming part of a number or group or for forming a combination of digits and letters the keyboard co-operating with a store and a panel for displaying symbols corresponding to those identifying the keys which have been pressed, the numbers, groups or combinations being adapted to be read inter alia into an input register and a store and to appear on a display panel in sequence and in the order in which they have been formed and means are provided for extracting the selections one at a time in order as needed for the automatic playing back of recordings, the recordings being of items of general information, e.g. in code, or musical or optical recordings or a combination of different kinds of recordings and a constant visual check being provided over the selection input, storage and output operations.

Figure 1:
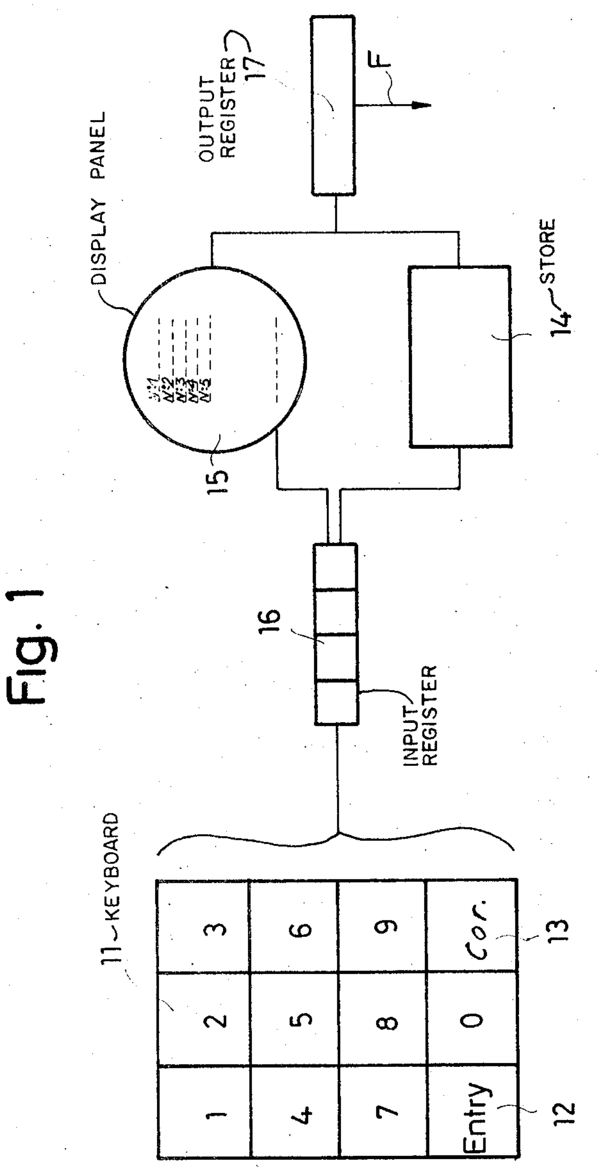

The invention will be more clearly understood from the following description of a non-limitative example with reference to the drawings:

FIG. 1 shows a keyboard selection entry and display system in accordance with the invention.

Figure 2:
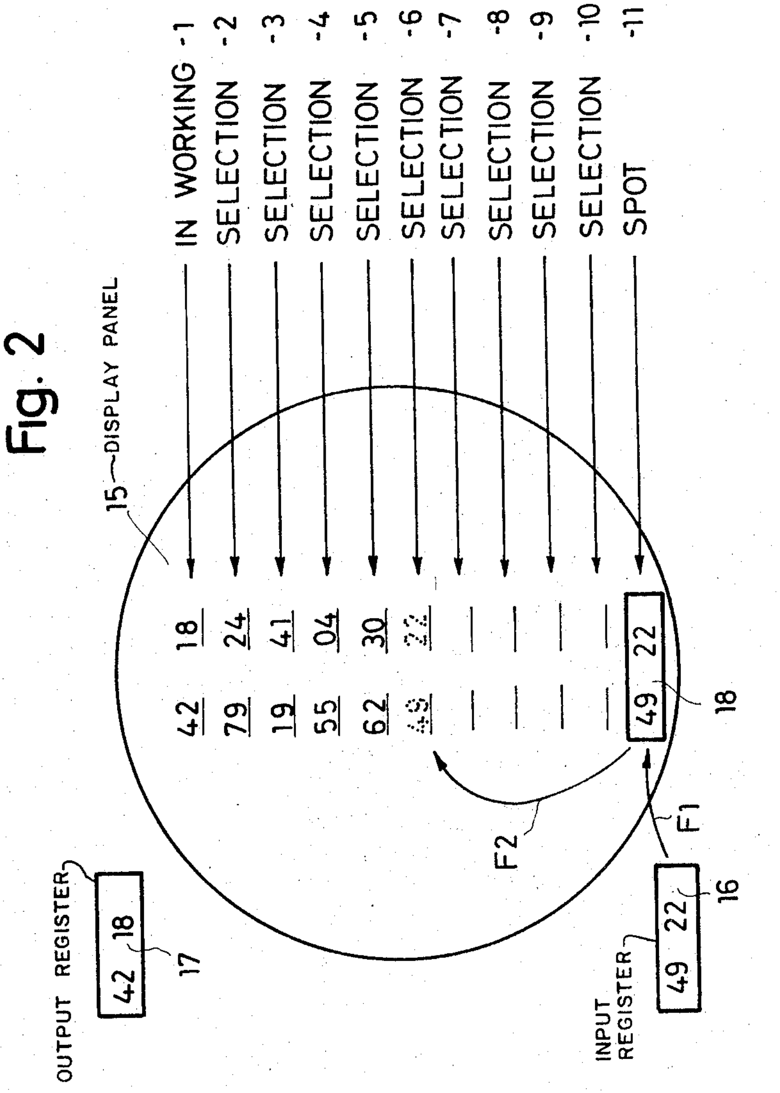
Figure 3:
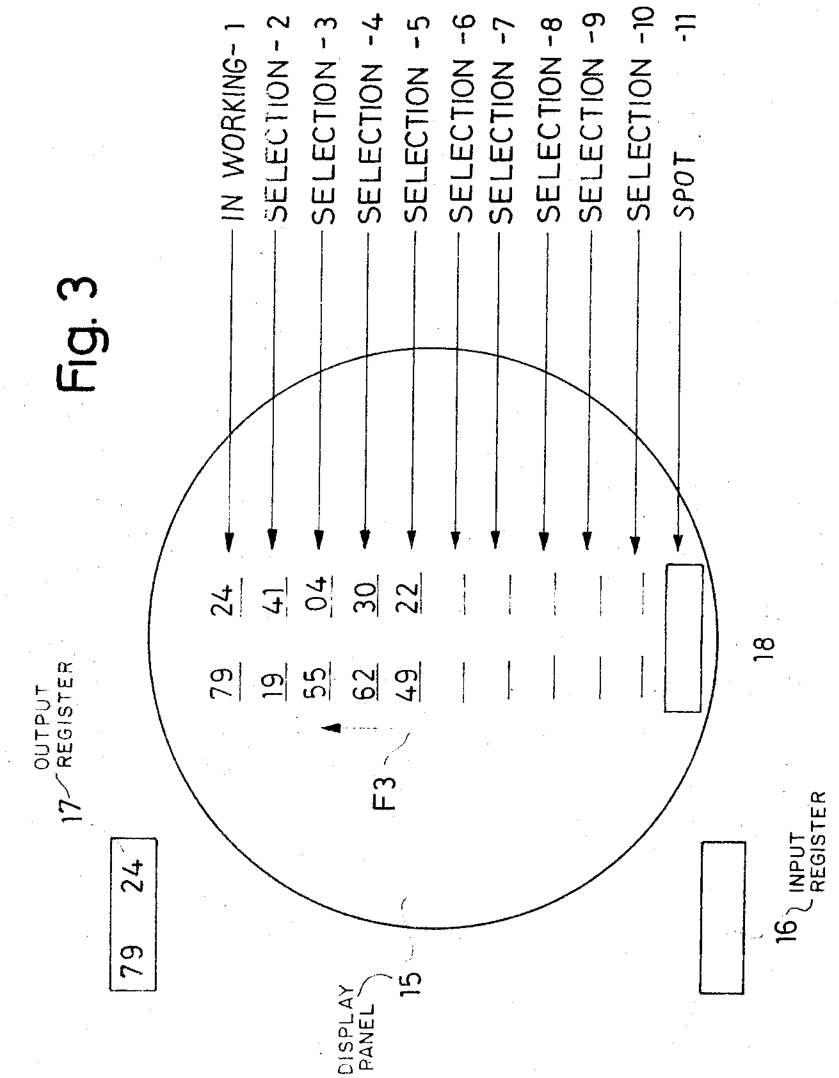
Figure 5:
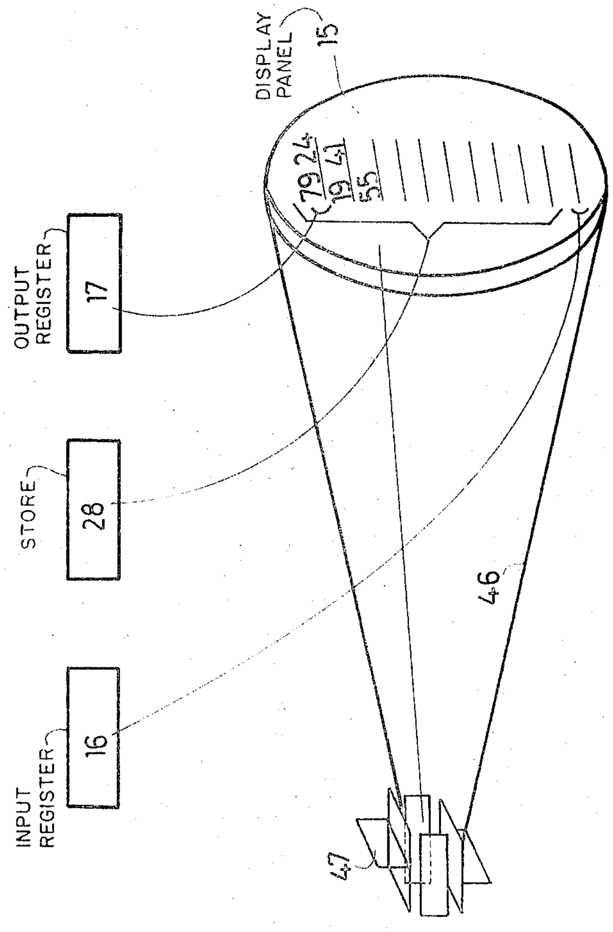

FIGS. 2, 3, and 5 show selection display formats.

Figure 4:
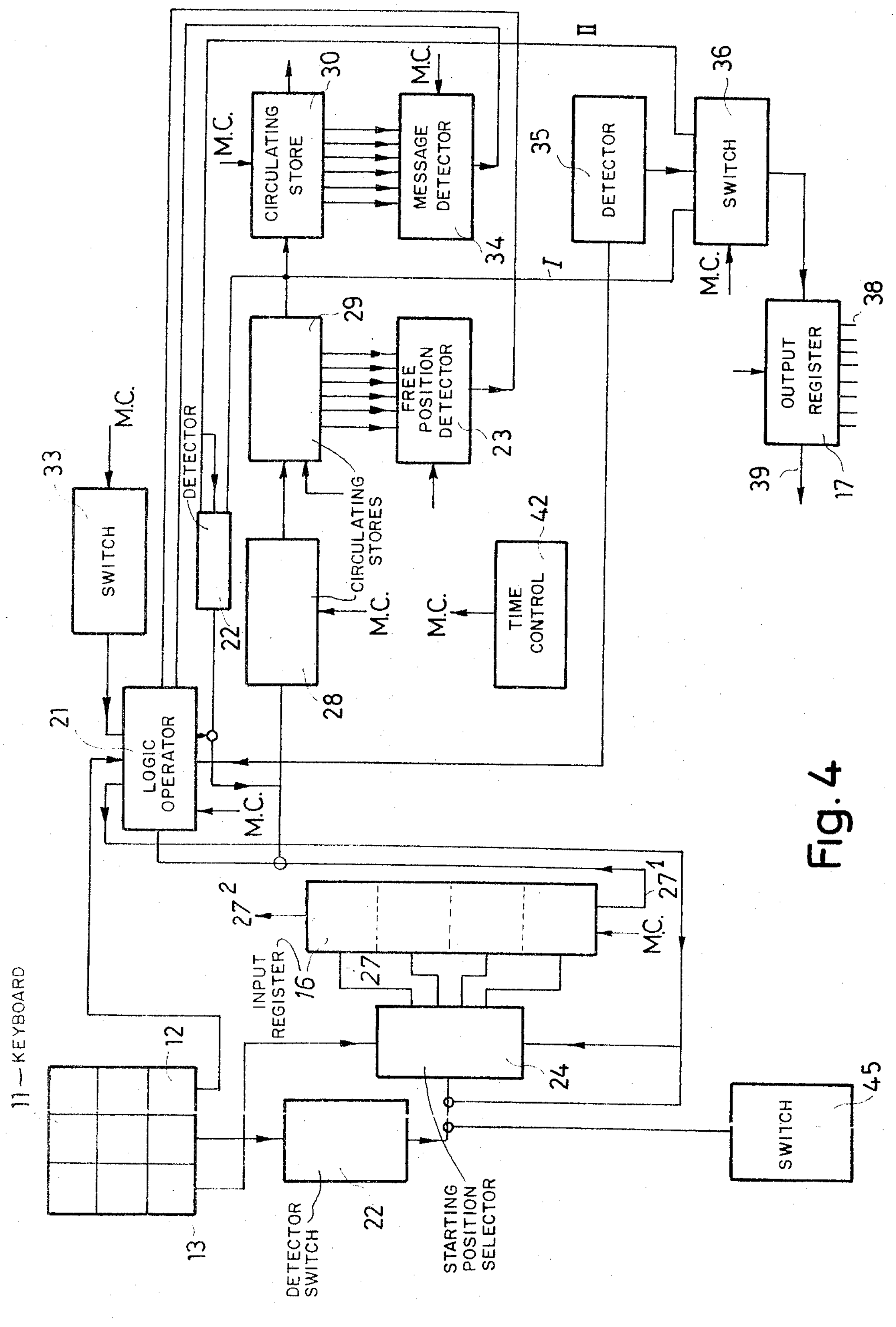

FIG. 4 is a more detailed showing of the system of FIG. 1.

The apparatus comprises a keyboard 11 used to form a selection by pressing keys identified by digits or letters so as to form a number, word, name or the like. The keyboard can also comprise an input key 12 and a correction key 13. It co-operates with a store 14 and a display panel 15 in such a manner that the digits corresponding to the keys which have been pressed (these digits can be read in an input register 16) are stored and appear in the display panel 15 in sequence and in the order in which they have been formed.

When a selection is complete and has been visually tested at location 11 (FIG. 2), the input key 12 is pressed so as to introduce into store 14 a selection waiting in the input register 16.

The selection which has been introduced is disposed at the top of the display panel 15 at the location of the first selection to be processed (location No. 1) or, as in FIG. 2, behind the previously-formulated selection (arrow $F_2$).

In the example shown, the selection 49–22 in the input register 16 is displayed at location 11 (arrow $F_1$, FIG. 1) in the sequence in which it is formed.

An output register 17 receives information relating to the selection being processed, which is displayed at location No. 1 (FIG. 2). The aforementioned information can be processed (arrow F, FIG. 1) by any suitable apparatus, e.g. by a device such as described and protected in a Patent Application in the name of the Applicant filed at the same time as the present Application and entitled:

"Apparatus for automatically reproducing information in cassettes."

The selection being processed remains in the output register and is displayed at location No. 1 of the display panel 15. The aforementioned selection (e.g., 42–18) also remains in the output register 17 (FIG. 2).

While selection No. 1 (e.g., 42–18) is being processed, other selections can be formed and introduced. The aforementioned subsequent selections are visually placed one below the other in order (e.g., 79–24; 19–41; 50–04, etc., in FIG. 2). A visual check is thus provided for the selections waiting at locations 2, 3, 4, 5, 6 etc.

When selection No. 1 has been completely processed and when the output register 17 receives the requisite information or order, it empties and the selection hitherto displayed at location No. 1 can be erased.

Location No. 1 becomes empty and is immediately filled by the next selection at location No. 2, which is simultaneously introduced into the output register for processing.

In the example, therefore, selection 42–18 has disappeared and its place has been taken by selection 79–24. Similarly, the selection formerly at 3 is moved to location No. 2, and so on (arrow $F_3$, FIG. 3).

The new selection in turn remains in the output register for the whole time during which it is processed. The cycle continues until the store has been emptied of all its selections.

When the store contains no further information, the detection of its state results in an item of information which can stop the processing apparatus.

The selector store can be of the "circulating" kind, i.e., wherein all the items of information for storage circulate continuously in a loop in accordance with an imposed capacity and rhythm so as to provide continuous access to the store in order to introduce, add, extract and display the selections therein, one after the other in order.

The display panel 15 can be an electron beam tube whose scanning action, in accordance with the rhythm of the store, is used to display the stored selections and any other useful information which can be fitted in the entire scanning cycle. More details will be given hereinafter.

When the information for display from the store or registers is, e.g., binary or coded, it is converted into digits or letters before being displayed.

An input register 16 disposed between the selection keyboard 11 and the store 14 can receive a complex selection which is in process of being made, so that the latter can be displayed in sequence as it is formed and not be introduced into store 14 by input key 12 until the entire selection has been visually checked (FIG. 2, reference 18), whereas the correction key 13 can empty the input register if an error is detected during visual checking at 18 before the selection has been finally introduced into the store (empty input register, FIG. 3).

The output register 17 retains information relating to a selection extracted from the store for the entire period during which the selection is being processed. The selection in the output register is the same as the selection displayed at location No. 1, (FIG. 2) and can therefore be indicated as the one being processed.

The active portion of the store can be supplied by a buffer current accumulator which can be recharged during normal operation of the selector so that if there is a power failure or if the apparatus is disconnected for a certain time, the selections in the store are not lost or disturbed but continue to rotate therein.

In the case of a pre-payment device, the state of absence of credit can act on the keyboard so as to render it inoperative (block 45, FIG. 4).

AN EXEMPLARY EMBODIMENT OF A SELECTOR (FIG. 4)

Since the various electronic elements are of conventional construction, their operation will be described in the form of a block diagram.

The selector assembly comprises an automatic addressing store provided with a modifiable preselector, an input writing facility, an output read-out facility and a panel for displaying operations. It comprises:

a. a ten-digit writing keyboard 11 having an input key 12 and a correction key 13;

b. an input or preselection register 16 for four BCD (Binary coded decimals) decimal digits having a series input 27, a series output $27^1$ and a parallel output $27^2$;

c. a circulating store (28–29–30) provided for ten groups of four decimal figures;

d. an output register 17 for reading at 38, used in parallel by the apparatus to be controlled;

e. an assembly of logic operators for distributing information in the store unit (28–29–30), the input register 16 and the output register 17; and f. a control unit 42 for distributing control orders in time among the different units (Mc, FIG. 4).

THE FORMULATION OF A SELECTION

Digits are introduced one after the other into the input or pre-selection register 16 by pressing on the relevant key of keyboard 11.

(The state of the input register 16 is sequentially read on the cathode screen 15, FIG. 5). As soon as the four digits have been chosen, input key 12 is pressed so as to introduce the number formed into the circulating store 28–29–30, if the latter has a free place. The free place is detected by an element 23 (a free position detector, FIG. 4). In the example, the store capacity is for ten selections.

Coded signals are formed for introduction into the preselection register 16.

A distributor frame 24 gives the necessary instructions for distributing the four respective figures among the four successive parts of the preselection register 18 (FIG. 2). A new choice can be begun at any instant during the introduction of data. To this end, the correction key 13 is pressed so as to reset the distribution frame to the starting position, i.e., to zero or the empty position, as shown by the absence of information displayed at location 11 (FIG. 3). Consequently, the distribution frame 24 automatically returns to the starting position as soon as a combination introduced into the preselection register by input key 12 is accepted by the circulating store.

STORAGE

The circulating store 28–29–30 comprises 176 binary positions, i.e., ten 16-digit words (ten words of four decimal digits) and a 16-digit word "one"(1) forming the first part of the message. The store is made up of three parts - a first part 28 comprising 144 positions accessible in series, a second part 30 comprising sixteen positions accessible in parallel and controlling a member for detecting the first part 34 of the message; and a third part 29 having the same structure as the second part and controlling a free-position detector 23.

If no input or output order is received, the items of information in the store circulate indefinitely in the three sections.

As soon as an input order is given by pressing key 12, the 16 items of binary information in the preselection register 16 slide in series into the first group of 16 free positions of the circulating store displayed on the screen (FIG. 2).

The block 21 of logic operators controlling the last-mentioned operation takes account of the results supplied in detector 34, detector 23 and a time control unit 42 which synchronises all the operations.

Block 42 also conveys an item of information for resetting to the starting position selector 24, which controls the preselection register 16. The same item releases the presed-key detector 22 which has temporarily been made inoperative in order to avoid simultaneous movement.

If instructed, block 21 also empties the entire contents of the circulating store if necessary.

Since the processing of the selection appearing in output register 17 and the order to present a new selection for processing must necessarily come from the apparatus controlled by the aforementioned selection, we shall now describe an embodiment of the selector and of an apparatus which can be coupled thereto.

In the example, we shall assume a coupling to apparatus in accordance with the application Ser. No. 177,987 filed Sept. 7, 1971 (Apparatus for automatically reproducing information in cassettes), wherein a photo-electric cell detects a zero rest position of the apparatus. The aforementioned position is identified by a logic level I or O which, via a switch 22 and a channel II, controls the filling of the output register 17 by the first selection for processing.

As soon as the apparatus processes the selection which has been presented, the logic level controlling channel II becomes O so as to give an item of information which allows the selection being processed to remain in the output register until the cycle has completely finished.

The items 38 of information from the output register 17 supply the playback apparatus with the elements of the selections (E1 and E2 in the U.S. Pat. application No. 177,987, filed Sept. 7, 1971).

Information from the playback apparatus requiring a novel selection comes from the playback apparatus and acts on channel II of the selector (see E15 in the U.S. Pat. application No. 177,987, filed Sept. 7, 1971.

READ-OUT AND ERASURE OF THE RELEVANT POSITION IN THE STORE

When it begins to operate, the detector 35 of the position of the rotating disc of the playback device (reference 3 in the aforementioned Application and control E 15 of the playback device in the same Application) indicates by a logic level that it is ready to receive an item of information. A switch is made (at 36) to the conditions of the first read-out, thus conveying the state of the circulating store given by channel II to the register 17 having an output 38 in parallel.

After the first read-out, while the state of the rotating disc detector 35 is O (it becomes O as soon as it is in operation), the output register 17 retains its item of information during the time when the apparatus is processing it.

As soon as the detector returns to the value I, the switch to the conditions of the first read-out takes the information from channel I, and the same applies to the store switch which jumps over the 16 binary positions corresponding to the preceding choices and thus provdes a free space.

In the example, the read-out information for controlling the cathode tube leaves the preselection register 16 at 27² (line 11, FIG. 2) and channel II (series output, lines 1 to 10, FIG. 2).

The first line gives the information present in the output register 17 read into the store, the aforementioned item being the first selection and not being erased from the circulating store or the output register until the disc position detector returns to the value I.

A manual element can be provided at 33 for completely emptying the contents of the store if necessary.

THE DISPLAY OPERATION

The selections which, during the formulation of a choice, are symbolised by digits or letters identifying the keys, are originally formed by items of corresponding coded information occurring throughout the selector.

If it is desired to display information contained in the store, the input register or the output register, it is therefore necessary each time, using a coding system, to form the digit, letter or symbol corresponding to that identifying the keys on which the choice has been originally formulated.

Each coding system therefore corresponds to a particular scanning curve and gives rise, each time it occurs, to a transformation adapting it to be read each time it is displayed.

In the assembly described, the display panel comprises an electron beam tube which is well known and whose scanning frequency is regulated by a clock so as to synchronise the readings made in different parts of the selector in accordance with an appropriate subdivision.

FIG. 5 shows the respective readings of the input register 16, the output register 17 and the store 28.

The scanning surface can be divided, e.g., 10/11 for displaying the contents of the store and 1/11 for displaying the contents of the input register. The first selection in the store, which is displayed in the first line, is the same as the selection in the output reigster (FIG. 3) (e.g. 79–24).

The use of an electron beam 46 (FIG. 5) for displaying letters, digits or symbols is well known. The required scanning curves can be obtained by using plates 47 (FIG. 5) to act on the horizontal and vertical deflections of the beam 46 and/or on its ignition or extinction with respect to the scanning time.

Consequently, each time an item of coded information appears in order to be displayed, it gives rises to other items adapted to deflect the electron beam and/or ignite or extinquish it in order to form the corresponding scanning curve.

THE CONTROL UNIT

A time unit 22 continuously provides pulses required for the circulation of information in the store. At appropriate instants, it also gives all the shift instructions for the input preselection register, the output register and the control logic operator block.

What I claim is:

1. In a selector for devices for automatically playing back information, the combination of:

a keyboard having keys identified by digits or letters, said keys being adapted to form, by pressing thereof, a number, word or name, or a combination of digits and letters;

a circulating store; and a display panel cooperating with said store and with the keyboard so that the combination of digits and letters corresponding to the keys which have been pressed in the keyboard are stored and the number, words, and the like, sequentially appear in the display panel in the order in which they have been formulated, and are adapted to be extracted one after another;

and an output register for receiving and retaining during the full time required for processing the selection one of the selections whose coordinates have been extracted from the store.

2. A selector according to claim 1, comprising means for conveying a new selection immediately into said output register from said store upon said output register being emptied from a preceding selection.

3. A selector according to claim 1, comprising a buffer current accumulator for supplying said store, said accumulator adapted to be recharged during normal operation of the selector, whereby upon power failure or intermittent disconnection of the device, the selections in said store remain undisturbed.

4. A selector according to claim 1, comprising a cathode screen for reading and checking the digits in said input register, an input key of said keyboard adapted to be pressed for introducing the number formed into a free space in said circulating store; and a free-position detector element for determining said free place in said store.

5. A selector according to claim 4, said circulating store comprising 176 binary positions or 10 six-digit words (10 words of four decimal digits) and a 16 digit word "one" (1) forming the first part of a message and, upon an input order being given by pressing a key of said keyboard, the 16 items of binary information in said input register are adapted to slide in series into the first group of sixteen free positions in the circulating store; a unit of logic operators being adapted to control the last-mentioned operation registers the results supplied to a detector for the first part of the message and the free-position detector (23); and a time control unit for synchronizing all of said operations.

6. A selector according to claim 1, the first selection in said store being indicated in a first line therein, said selection being the same as the selection given in the output register.

7. A selector according to claim 4, comprising an electron beam tube emanating an election beam each time an item of coded information appears in order to be displayed, and generating other items of information adapted to deflect the electron beam so as to each time form the appropriate scanning curve.

* * * * *